(12) United States Patent
Jou et al.

(10) Patent No.: US 6,181,123 B1
(45) Date of Patent: Jan. 30, 2001

(54) DIGITAL PROGRAMMABLE DIRECT CURRENT TO DIRECT CURRENT (DC-DC) VOLTAGE-DOWN CONVERTER

(75) Inventors: Shyh-Jye Jou, Taoyuan Hsien; Chi-Lin Chen, Taipei Hsien; Li-Kuo Liu, Hsinchu, all of (TW)

(73) Assignee: Farady Technology Corp., Hsinchu (TW)

( * ) Notice: Under 35 U.S.C. 154(b), the term of this patent shall be extended for 0 days.

(21) Appl. No.: 09/267,879

(22) Filed: Mar. 11, 1999

(30) Foreign Application Priority Data

Jan. 6, 1999 (TW) ................................. 88100101

(51) Int. Cl.[7] .......................... G05B 24/02; H02M 1/12
(52) U.S. Cl. ............................. 323/351; 363/41
(58) Field of Search ................................ 323/225, 283, 323/344, 345, 346, 351; 363/41

(56) References Cited

U.S. PATENT DOCUMENTS 5,594,631 * 1/1997 Katoozi et al. ................. 363/41
5,969,515 * 10/1999 Oglesbee ..................... 323/351 X

* cited by examiner

*Primary Examiner*—Jessica Han
(74) *Attorney, Agent, or Firm*—J.C. Patents; Jiawei Huang

(57) ABSTRACT

A digital programmable DC—DC voltage-down converter which can be used in a low voltage and low power digital circuit design is disclosed. The DC—DC voltage-down converter includes at least a digitally controlled oscillator (DCO), a pulse-width modulator (PWM), a gate driver, and a switching-type voltage-down converter. Duty cycle and operating frequency of the modulated signal are controlled by using two digital control signals. Furthermore, combining the pulse-width modulator and the digitally controlled oscillator (DCO), the duty cycle of the generated clock is more robustly stable for different frequencies during process variation.

9 Claims, 11 Drawing Sheets

DIGITAL PROGRAMMABLE DIRECT CURRENT TO DIRECT CURRENT (DC-DC) VOLTAGE-DOWN CONVERTER

CROSS-REFERENCE TO RELATED APPLICATION

This application claims the priority benefit of Taiwan application serial no. 88100101, filed Jan. 6, 1999, the full disclosure of which is incorporated herein by reference.

BACKGROUND OF THE INVENTION

1. Field of Invention

The present invention generally relates to a voltage-down device, and more particularly to a digital voltage-down device.

2. Description of Related Art

Low-voltage and low-power integrated circuit design draws greater attention over the past few years as electronic devices become more compact in size and lighter in weight. The reason behind is that the reliability and power dissipation problems that down-sized transistors have encountered. The introduction of portable electronic devices further reveals the importance of low-voltage and low-power devices. Take the complementary metal oxide semiconductor (CMOS) circuits for example. There are three major types of power dissipation involved, among which the dynamic power dissipation $P_d$ is the most important one. The dynamic power dissipation for one charge-discharge cycle is $P_d = CV_{DD}^2 f$, in which C is the equivalent loading capacitance, $V_{DD}$ is the operating voltage, and f is the operating frequency. Apparently, the power dissipation can be reduced if the operating voltage $V_{DD}$ is reduced. However, the delay time in the circuits nevertheless increases by doing so.

Refer to FIG. 1A, which shows a circuit diagram of a conventional switching-type DC—DC voltage-down converter. An input voltage $V_{IN}$ is reduced to a lower output voltage $V_{OUT}$ as the operating voltage to logic gates in the integrated circuits. In FIG. 1, control pulse signals φpp and φnn having different phases are used as inputs to a PMOS transistor 20 and a NMOS transistor 22 so that the PMOS transistor 20 and the NMOS transistor 22 can be alternatively turned on to generate a pulse signal $V_x$. Subsequently, the pulse signal $V_x$ is filtered by a low-pass filter 24 comprising an inductor $L_f$ and a capacitor $C_L$ to generate a steady-state DC output voltage $V_{OUT}$. The input voltage $V_{IN}$ and output voltage $V_{OUT}$ have a relationship of $V_{OUT} = D \cdot V_{IN}$, in which D is the duty cycle defined as $D = T_{ON}/T_{CYCLE}$, $T_{ON}$ is elapsed time when the pulse signal is at logic "1" state, and $T_{CYCLE}$ is the period of a pulse signal. For easy reference, several design formulas to design a steady-state DC—DC voltage-down converter are listed below.

$$V_{OUT} = D \cdot V_{IN}$$

$$L_f = \frac{V_{OUT}(1-D)}{\Delta I_L \cdot f_O} \quad \text{or} \quad f_O = \frac{V_{OUT}(1-D)}{\Delta I_L \cdot L_f}$$

$$C_f = \frac{\Delta I_L}{8 \Delta V_{OUT} \cdot f_O} \quad \text{or} \quad f_O = \frac{\Delta I_L}{8 \Delta V_{OUT} \cdot C_f}$$

where $\Delta I_L$ is the variation of current flowed through the inductor $L_f$ in the low-pass filter 24, $\Delta V_{OUT}$ is the variation of voltage across the capacitor $C_L$ in the low-pass filter 24, $f_O$ is the operating frequency of the pulse signal, and D is the duty cycle.

From the above formulas, it is understood that a set of control pulse signals φ pp and φnn to obtain an accurate duty cycle need to be provided, based on which the inductance $L_f$ and the capacitance $C_L$ in the low-pass filter 24 can be calculated to obtain a desirable steady-state DC output voltage.

Refer to FIG. 1B, which shows a circuit diagram of a conventional pulse-width modulator (PWM) comprising a counter 26, a D flip-flop 28, and a RS flip-flop 30. The PWM generates a pulse signal whose duty cycle is controlled by a duty cycle control signal. Generally, the PWM requires a pulse signal $f_{high}$ as an input signal to the counter 26, whose frequency is M times as high as the operating frequency of a clocking signal CLK($f_O$) so as to generate PWM outputs with different duty cycles. At the initial stage, the PWM output signal from the RS flip-flop 30 in the PWM circuit is set to logic "1" state. When the counter 26 detects a preset period L, the PWM output signal is then reset to logic "0" state so as to generate a pulse signal having a frequency $f_O$ and a duty cycle L/M. Unfortunately, the PWM circuit requires a control pulse signal with a frequency M times as high as the operating frequency $f_O$ as an input signal. This will increase power dissipation in the PWM circuit, and consequently reduce the working efficiency of the DC—DC voltage-down converter. Furthermore, when a better accuracy for the output voltage is required, the duty cycle demands a higher accuracy. Thus, the pulse signal $f_{high}$ with an even higher frequency than the operating frequency $f_O$ is then inevitably required. For example, when the operating frequency $f_O$=1 MHz and 128 adjustment levels for the output voltage are required, the frequency required for the pulse signal $f_{high}$ will be up to 128 MHz. Therefore, not only the power dissipation significantly increases, but also the complexities in designing the circuits.

Refer to FIG. 1C, which shows a circuit diagram of another conventional pulse-width modulator (PWM), in which a tapped delay line circuit is used to generate a PWM output signal having a desired duty cycle based on a digital control word. The number of the tapped buffers 32 is the same as that of different duty cycles required. When a pulse signal CLK($f_O$) is received, the PWM output signal from the RS flip-flop 36 is set to logic "1" state. When the $2^N$-to-one multiplexer 38 receives a N-digits duty-cycle control signal, an output signal from one of the tapped buffer is generated at the output terminal of the multiplexer 38 to reset the RS flip-flop 36 so that the PWM output signal is set to logic "0" state. The approach no longer requires a pulse signal $f_{high}$ which has a frequency M-times as high as the operating frequency $f_O$. However, it is very difficult to fabricate tapped buffers having an identical delay time $T_{CELL}=1/MT_O$. Furthermore, because the delay time of each buffer is fixed, if $T_O(f_O)$ is changed, the duty cycle generated by this tapped delay line is no longer the desired one.

As a summary, the conventional DC—DC voltage-down converter requires an accurate duty cycle to obtain a steady-state DC output voltage. Furthermore, the PWM circuit requires a pulse signal $f_{high}$ as an input, which requires a frequency M-times as high as the operating frequency. Therefore, the power dissipation of the PWM circuit increases and the working efficiency of the DC—DC voltage-down converter is reduced.

SUMMARY OF THE INVENTION

The invention provides a digital programmable DC—DC voltage-down converter, which the duty cycle and operating frequency of the modulated signal can be adjusted using two digital control words.

The digital programmable DC—DC voltage-down converter comprises at least a digitally controlled oscillator (DCO), a pulse-width modulator (PWM), a gate driver, and a switching-type voltage-down converter. The digitally controlled oscillator receives a K-bits external frequency control signal to generate a clocking signal with a desired frequency. The PWM controlled by a N-bits external duty-cycle control signal receives the clocking signal from the DCO to generate a pulse-width modulation signal. The gate driver receives the pulse-width modulation signal from the PWM and generates a set of pulse control signals to control the conductive time of the PMOS and NMOS transistors in the switching-type voltage-down converter. The switching-type voltage-down converter reduces an externally applied DC voltage source $V_{IN}$ to a desired output voltage $V_{OUT}$ by using two MOS transistors which are alternatively turned on and a low-pass filter.

The frequency and duty cycle of the modulated pulse signals of the digital programmable DC—DC voltage-down converter according to the present invention can be adjusted by using two digital control words. Also, the duty cycle of the pulse width modulation signal will not change due to the use of different clock frequency. Furthermore, the pulse signal which requires a frequency many times as high as the operating frequency in the conventional design is not required. Therefore, the power dissipation of the disclosed DC—DC voltage-down converter can be reduced, and the working efficiency of the DC—DC voltage-down converter can be significantly enhanced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
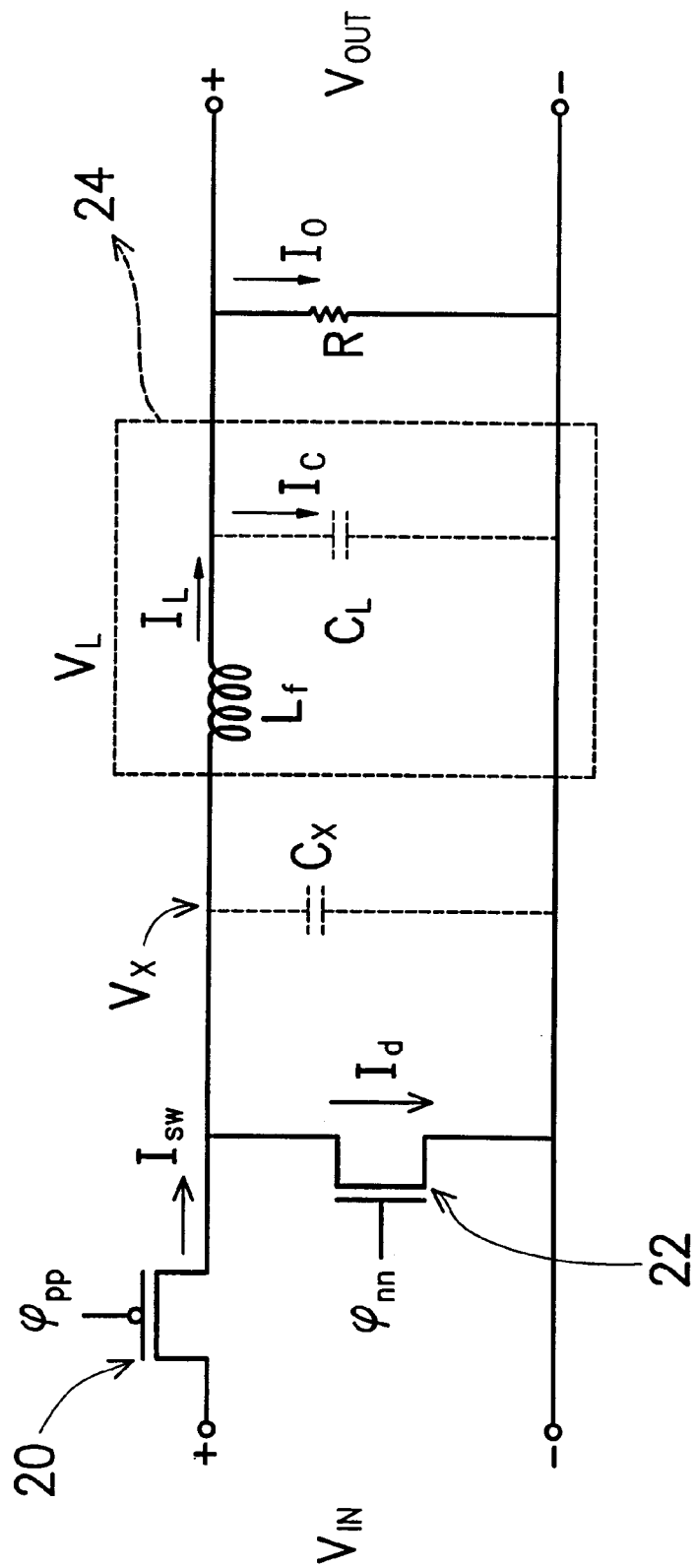
FIG. 1A is a circuit diagram of a conventional switching-type DC—DC voltage-down converter.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
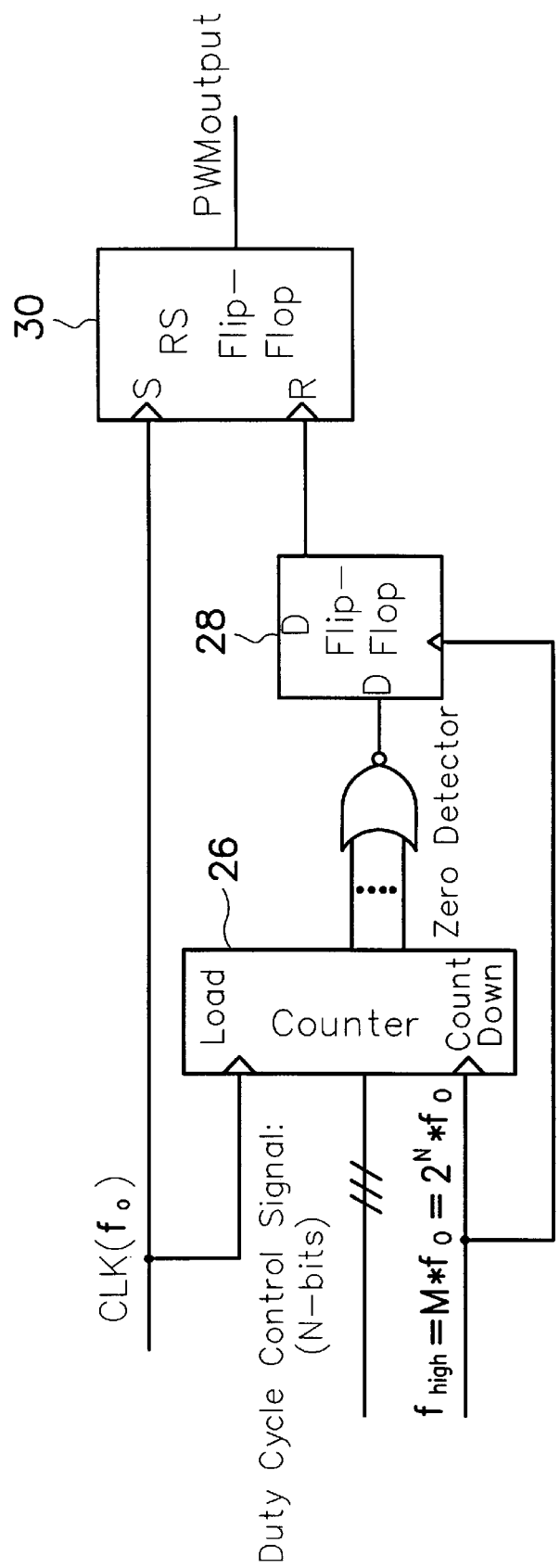
FIG. 1B is a circuit diagram of a conventional pulse-width modulator (PWM)
Figure 1C:
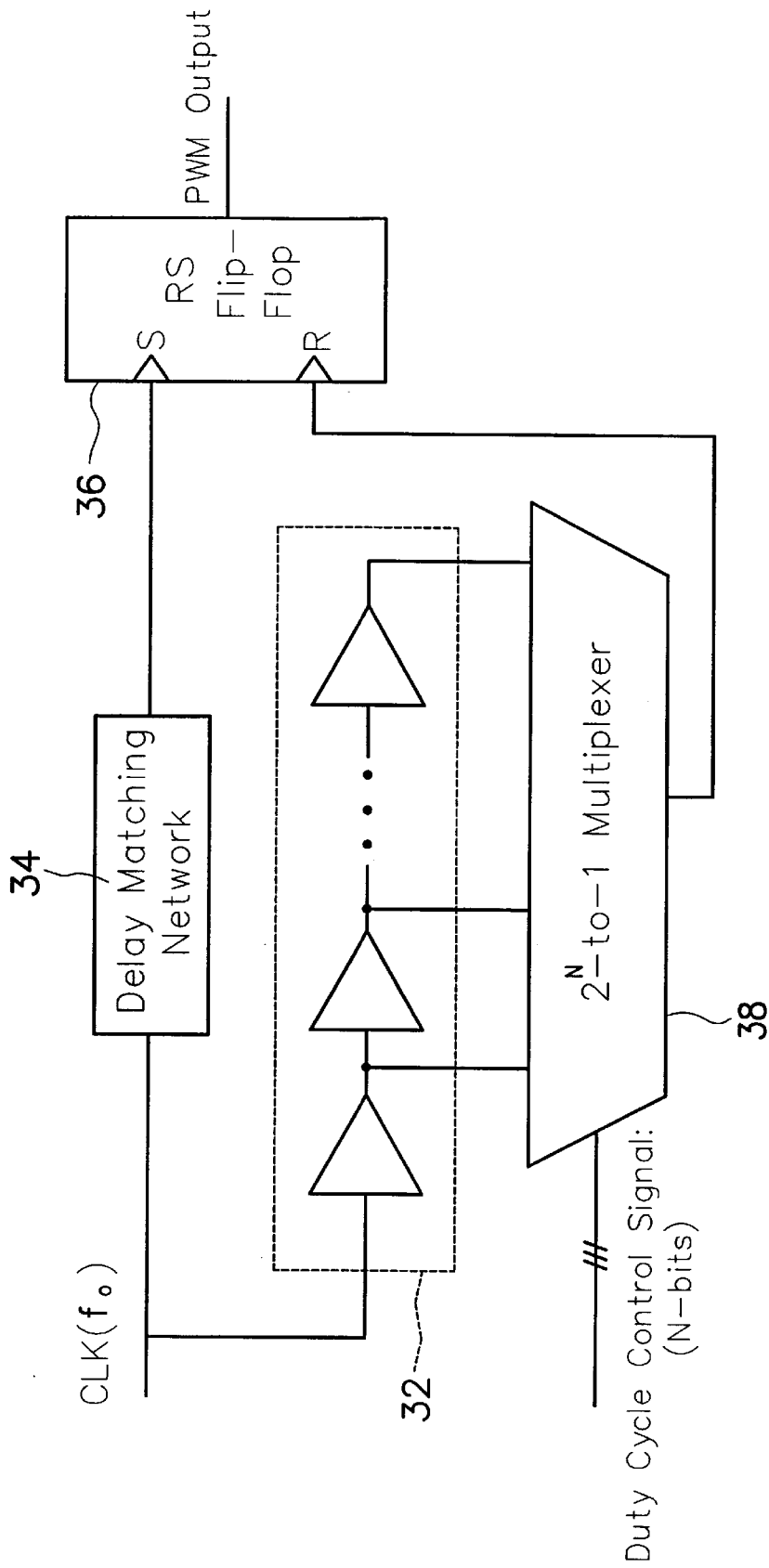
FIG. 1C is a circuit diagram of another conventional pulse-width modulator (PWM)
Figure 2:
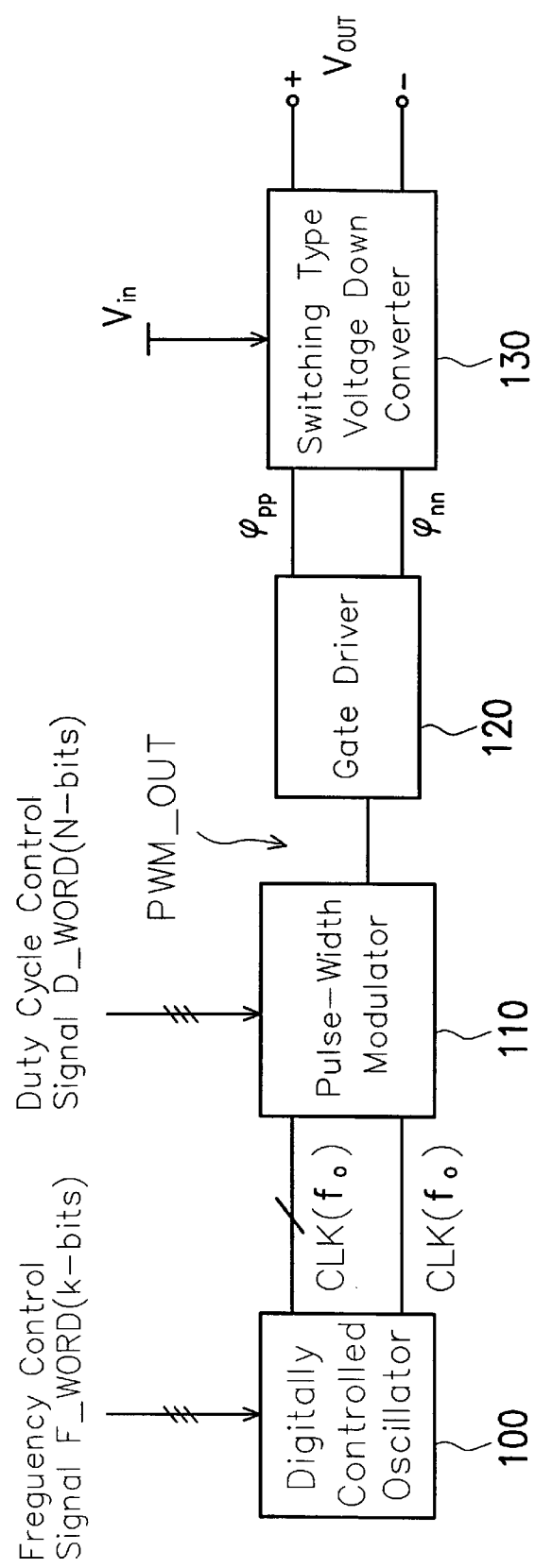
FIG. 2 is a schematic block diagram of a digital programmable DC—DC voltage-down converter according to a preferred embodiment of the present invention.

FIG. 2 shows a schematic block diagram of a digital programmable DC—DC voltage-down converter according to a preferred embodiment of the present invention, which comprises a digitally controlled oscillator (DCO) 100, a pulse-width modulator (PWM) 110, a gate driver 120, and a switching-type voltage-down converter 130. The digitally controlled oscillator 100 receives a K-bits frequency control signal F_WORD to generate a clocking signal $CLK(f_0)$ with a frequency $f_0$. The pulse-width modulator 110 controlled by a N-bits duty-cycle control signal D_WORD receives the clocking signal $CLK(f_0)$ to generate a PWM output signal PWM_OUT with a desirable duty cycle. The gate driver 120 receives the PWM output signal PWM_OUT from the PWM 110 to generate a set of pulse control signals φpp and φnn to control the conductive time of the PMOS and NMOS transistors in the switching-type voltage-down converter 130, which has the same circuit structure as FIG. 1. The switching-type voltage-down converter 130 reduces an externally applied input voltage $V_{IN}$ to generate a DC output voltage $V_{OUT}$ through the alternatively conductive MOS transistors 20 and 22 and the low-pass filter 24.

Figure 3A:
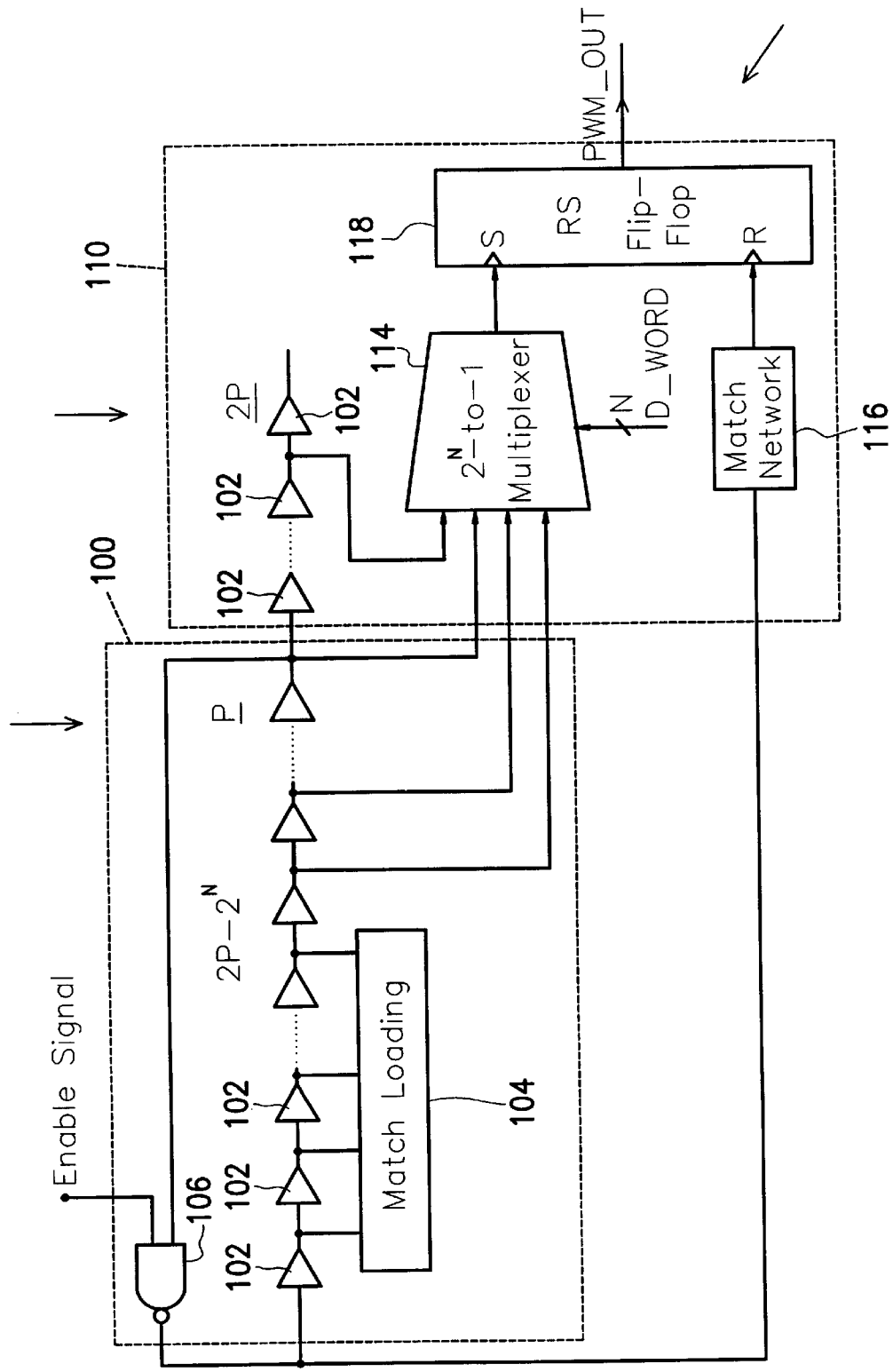
FIG. 3A is a circuit diagram of a digitally controlled oscillator and a pulse-width modulator of FIG. 2.
Figure 3B:
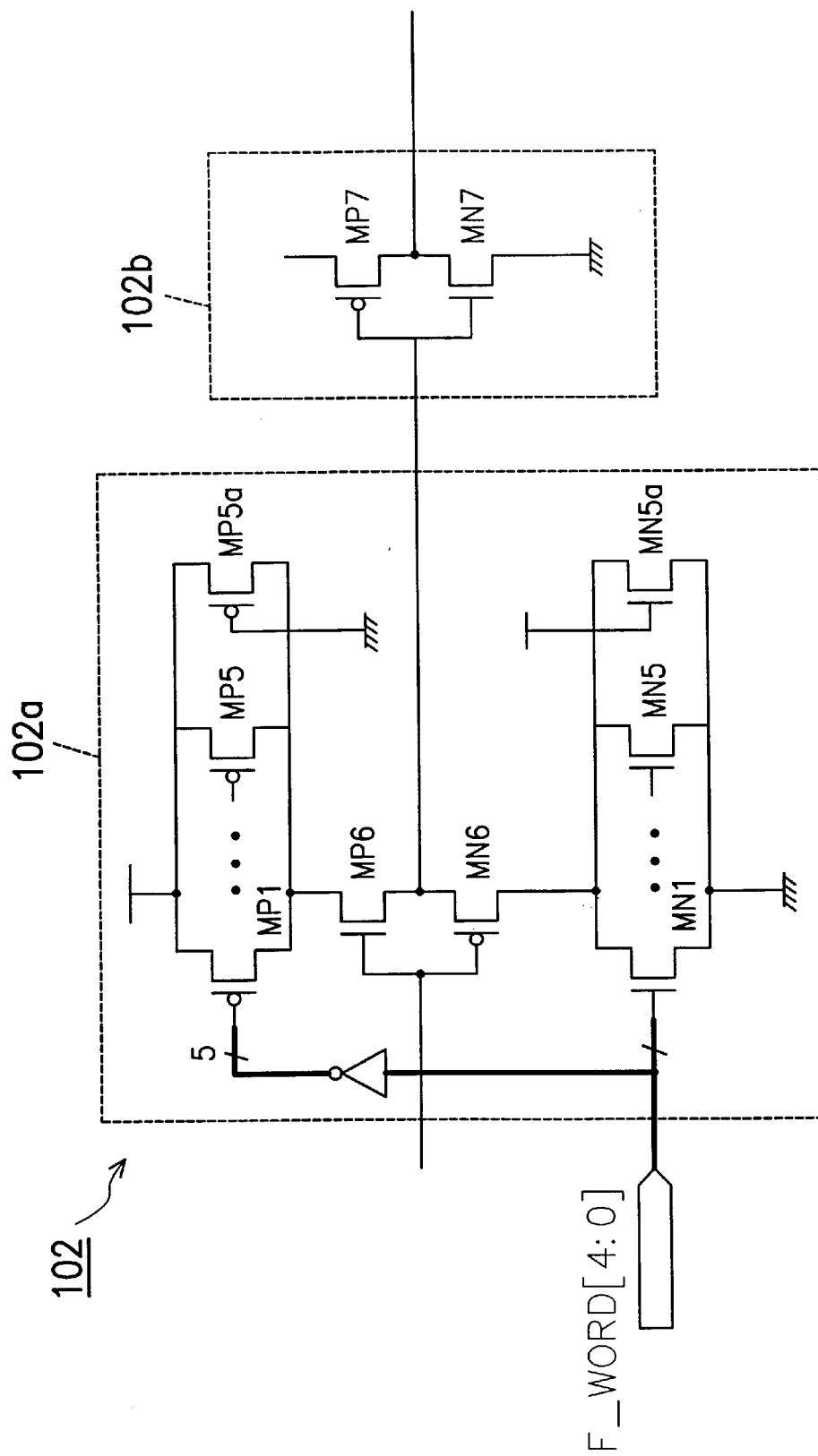
FIG. 3B is a circuit diagram of a delay cell in FIG. 3A.
Figure 3C:
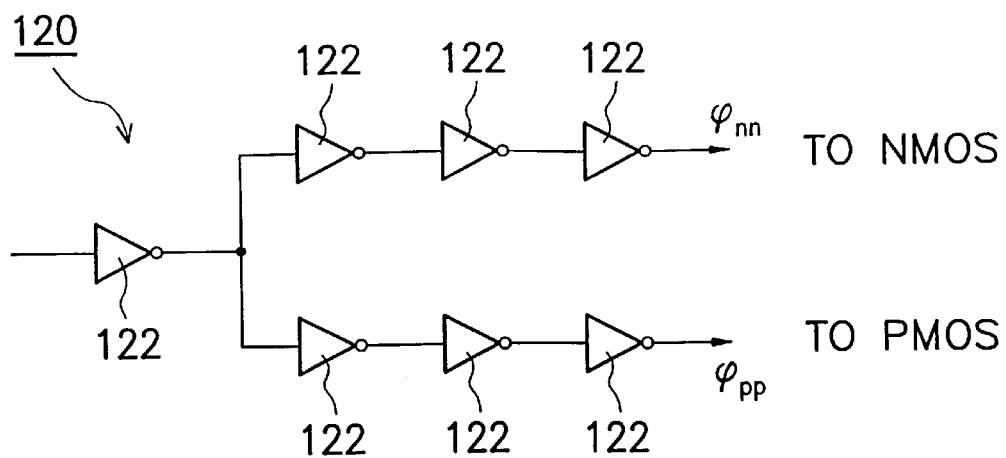
FIG. 3C is a circuit diagram of the gate driver 120 in FIG. 2.

FIGS. 3A through 3C focus on individual block in FIG. 2 so as to provide a detailed description.

Refer to FIG. 3A, which shows a circuit diagram of a digitally controlled oscillator 100 and a pulse-width modulator (PWM) 110 of FIG. 2. Conventional voltage-controlled oscillator (VCO) generates a signal whose frequency is determined by a particular voltage. However, the digitally controlled oscillator generates a frequency based on the binary-weighted characteristics of a control word. The digitally controlled oscillator 100 in the digital programmable DC—DC voltage-down converter comprises a ring oscillator consisted of P delay cells 102 and a tow-input NAND gate 106 as shown in Block 100 by dotted lines in FIG. 3A. The delay time of NAND gate 106 is designed to be much smaller than that of delay cell 102.

Figure 4:
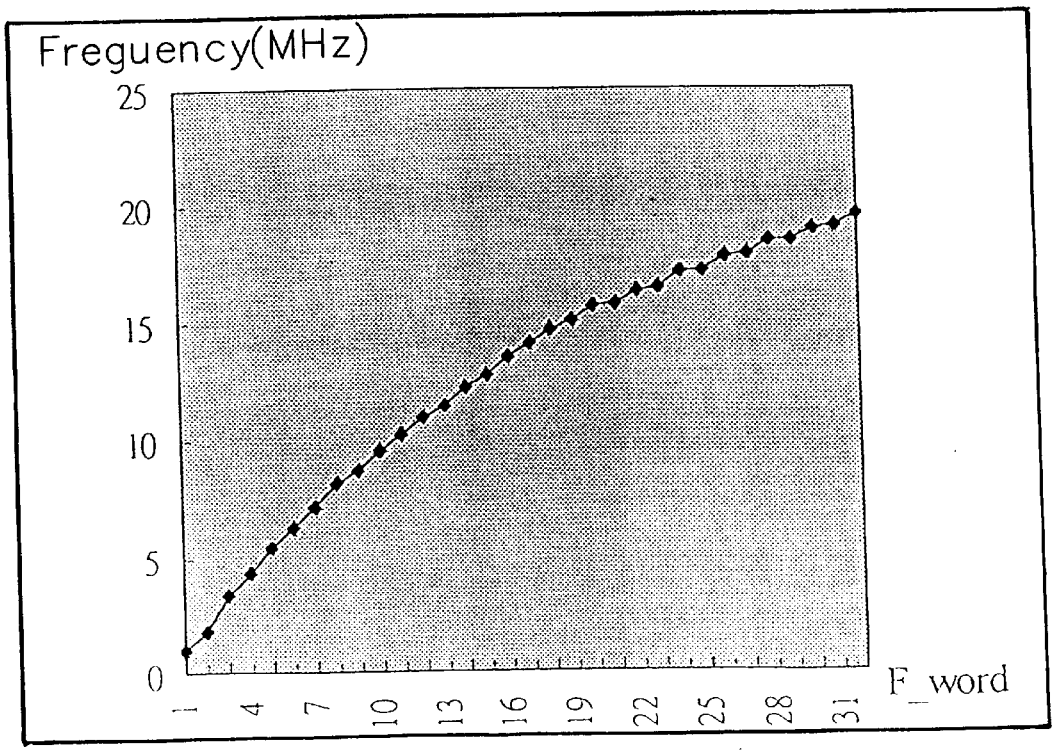
FIG. 4 is a simulation result of a clocking signal using a simulation software HSPICE.

The delay cell 102 comprising a digital control unit 102a and an inverter 102b as shown in FIG. 3B is controlled by a K-bits frequency control signal F_WORD. The channel width of transistors MP5~MP1 and MN5~MN1 are proportionally increased on a binary-weighted basis. Thus, the delay cell 102 is controlled by the K-bits frequency control signal F_WORD to change the delay time so as to obtain a desired frequency. Increasing the number of bits of the frequency control signal F_WORD can therefore increases the frequency resolution. In this example, a 5-bits frequency control signal F_WORD [4:0] is used to control the frequency of the generated pulse signal. That is, the generated signal has a frequency ranging from 1 MHz (F_WORD= 00000) to 20 MHz (F_WORD=11111) with a frequency resolution of 0.625 MHz. Refer to FIG. 4, which shows a simulation result of a clocking signal using a simulation software HSPICE, in which the horizontal axis represents a decimal value of the 5-bits frequency control signal F_WORD while the vertical axis represents the value of the frequency generated. As a result, the frequency resolution can be increased by increasing the number of bits of the frequency control signal F_WORD.

Also, inductors are generally very sensitive and easily affected by the environment during a fabrication process. Thus, the variation of inductance is usually very large. If the frequency can be digitally controlled, then readily available capacitors and inductors can then be used to obtain the desired frequency instead of using specific capacitance and inductance values, which generally cause great difficulty in a conventional design approach.

Refer to FIG. 3A, where the pulse signal from the digitally controlled oscillator is modulated through the PWM by using a a delay-line concept. In FIG. 3A, a duty-cycle control signal D_WORD coupled to a multiplexer 114 is used to select an output among various outputs from the 2P delay cells 102. By using the time difference between the R and S terminals of the RS flip-flop 118, a modulated pulse signal PWM_OUT can be obtained.

Assume that modulation step of duty cycle is x %, the resolution of output voltage is $V_{STEP}$, and P represents stages of delay cells in the digitally controlled oscillator, and N represents number of bits of the duty-cycle control signal. That is, $$1/2P = x \%,$$

and $$2^N < 2^P$$

$$V_{STEP} = V_{DD} \cdot x \%$$

The duty cycle ranging from $(2P-2^N)\cdot x \%$ to $(1-x \%)$ can be obtained.

By combining the digitally controlled oscillator and the pulse-width modulator together, the duty cycle D of the generated pulse signal remains unchanged when the operating frequency varies because identical delay cells 102 are used in both the digitally controlled oscillator and the pulse width modulator. The match network 116 in FIG. 3A is a dummy circuit corresponding to the $2^N$-to-one multiplexer 114. Time delay between the S and R terminals of the flip-flop 118 due to the $2^N$-to-one multiplexer 114 is therefore eliminated. Similarly, a match loading 104 is used so that load for every delay cell 102 is the same.

Figure 5:
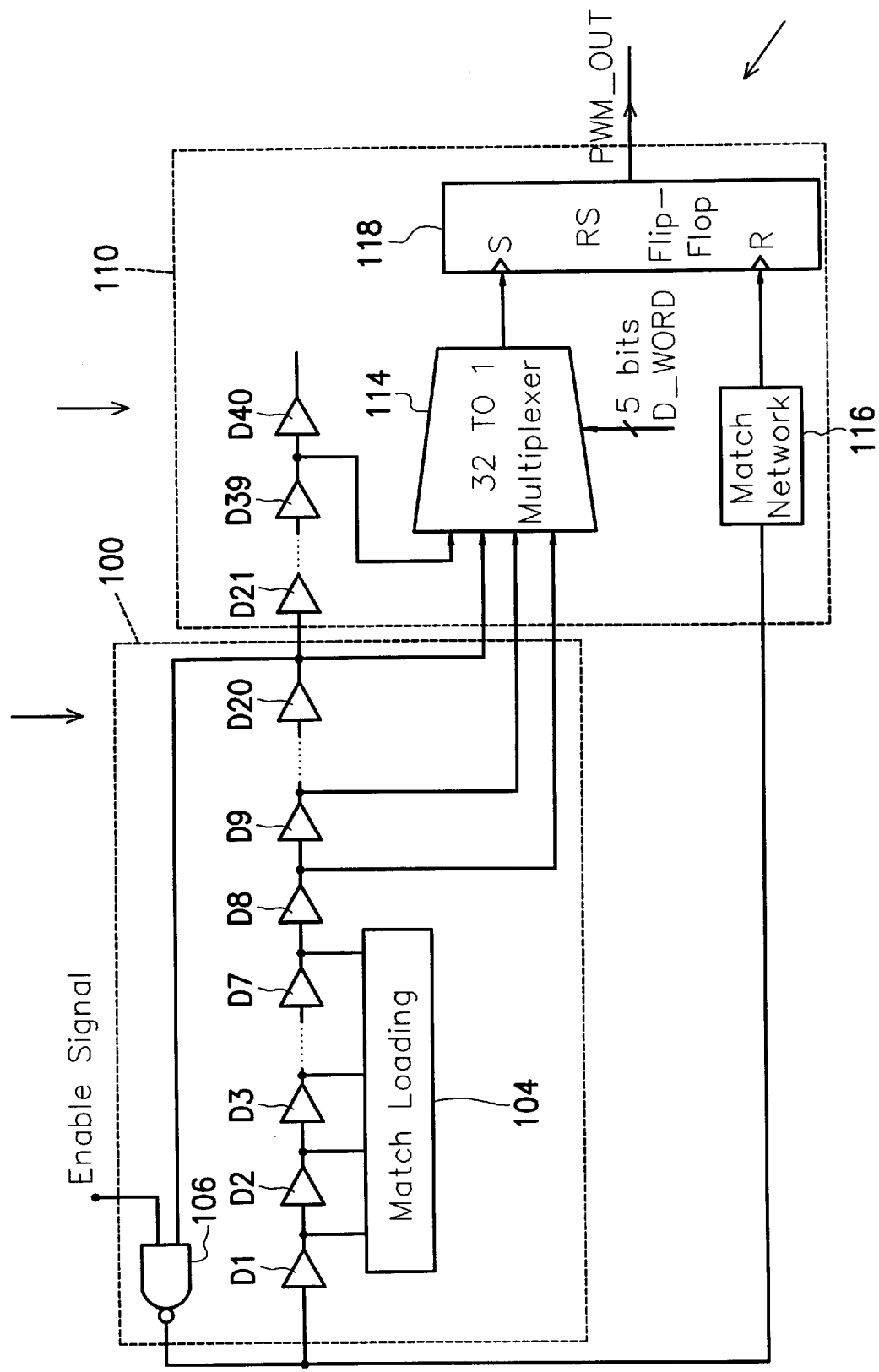
FIG. 5 is a circuit diagram using a 5-bits duty cycle control signal to generate a PWM output signal according to a preferred embodiment of the present invention.

Refer to FIG. 5, in which a circuit diagram using a 5-bits duty cycle control signal D-WORD to control a 32-to-1 multiplexer 114 so that one of the delay cell ($D_n$, n=8,9, . . . 39) outputs is selected according to a preferred embodiment of the present invention. As shown in FIG. 5, the duty cycle of the modulated pulse signal PWM_OUT ranges from D=20% to 97.5% (2.5% per level). For a voltage source of $V_{DD}$=5 volts, the output voltage PWM_OUT ranges from 1 volt to 4.875 volts with a resolution of 0.125 volt.

Refer to FIG. 3C, where a circuit diagram of the gate driver 120 in FIG. 3A is depicted. The gate driver 120 comprises a plurality of inverters 122 cascaded in series to generate a pulse control signal φpp and a pulse control signal φnn, which are coupled to the gate of the PMOS transistor and NMOS transistor in the switching-type voltage-down converter 130 to control the conductive time of the PMOS and NMOS transistors. Therefore, the extremely large short-circuit current can be prevented because the PMOS and NMOS transistors won't be turned on at the same time. Consequently, the power dissipation can be minimized.

Furthermore, the gate driver 120 can provide sufficient driving capacities so that signal at the gate of the MOS transistors possesses a reasonably good response time.

To illustrate the effectiveness of the present invention, design specifications and power dissipation of a design example of using a 0.6 μm single-poly-tripple-metal (SPTM) CMOS process are listed in Table 1 and Table 2, respectively.

Figure 6A:
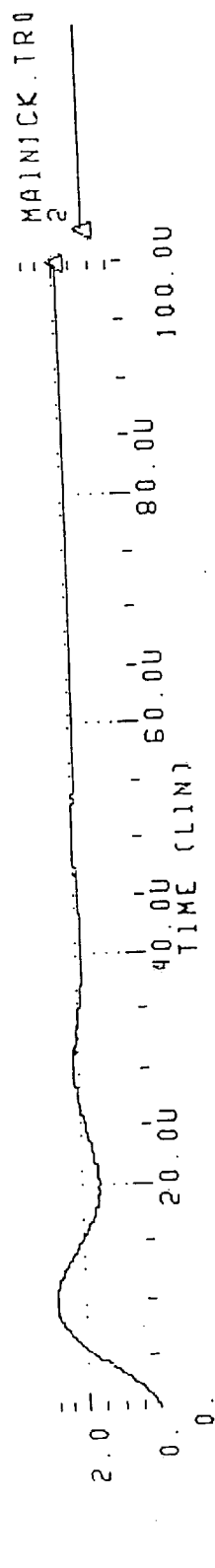
FIGS. 6A and 6B are waveforms of the output voltage $V_{OUT}$ and the PWM output signal.
Figure 6B:
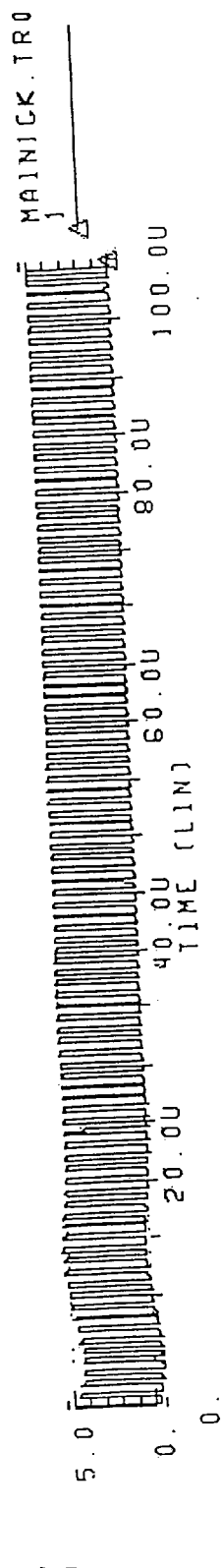

FIGS. 6A and 6B show waveforms of the output voltage $V_{OUT}$ and the PWM output signal by using a simulation software HSPICE. As shown in FIG. 6A and FIG. 6B, the duty cycle of the pulse signal is 40%, the output voltage is 1.965 volts, and time frame required to achieve a steady-state output is about 50 μs.

Figure 7:
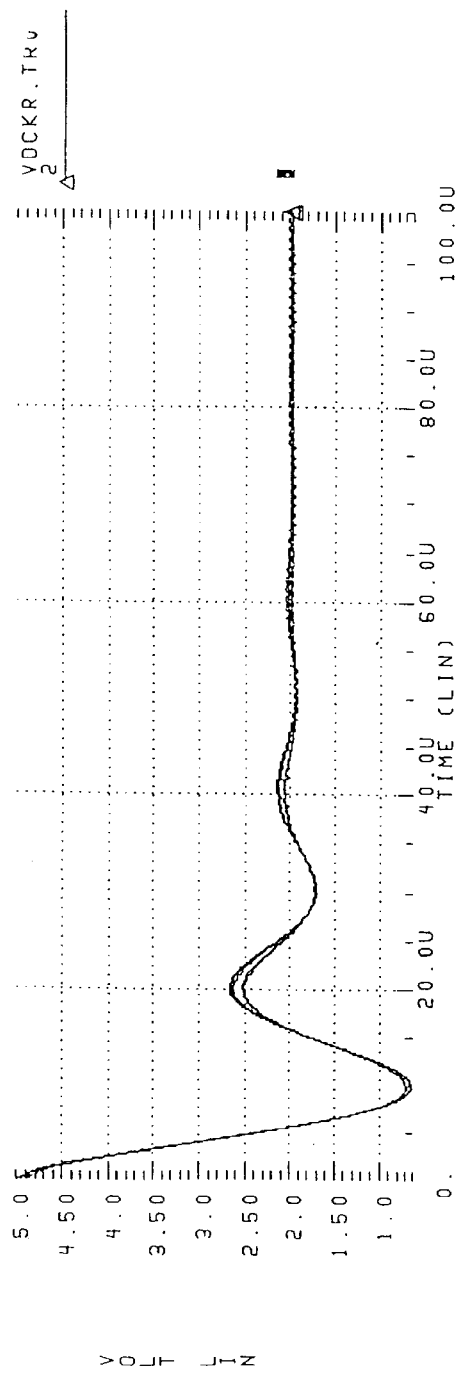
FIG. 7 is a diagram showing the output voltage $V_{OUT}$ as the loading resistance R varies.

FIG. 7 is a diagram showing the output voltage $V_{OUT}$ as the loading resistance R varies from 10Ω to 10000Ω. It is well known that changes in the loading resistance R result in changes in the output current $I_O$. However, the output voltage $V_{OUT}$ is basically not affected and remains the same.

Figure 8:
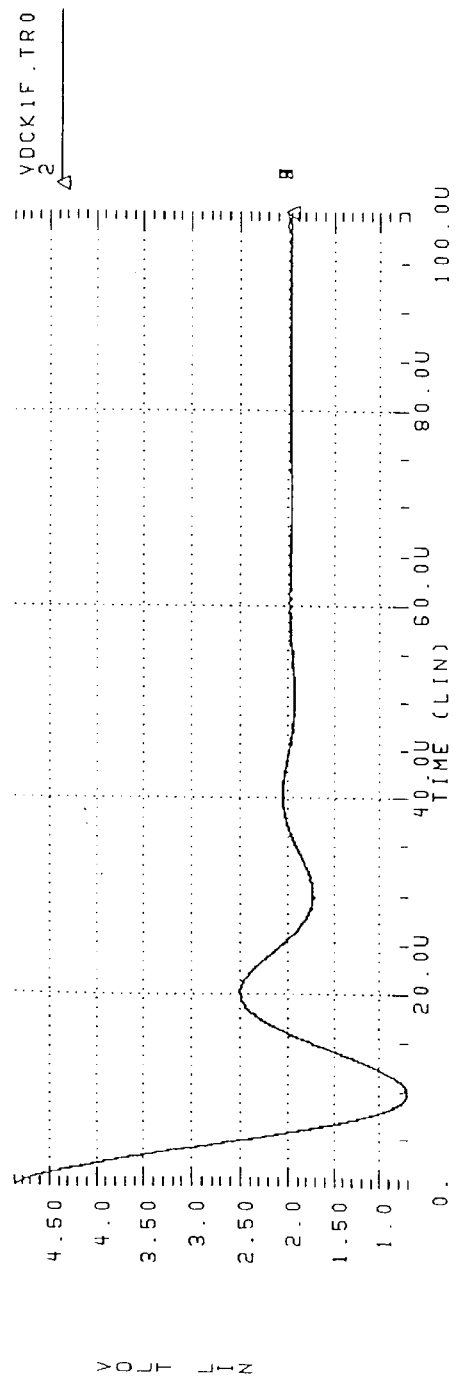
FIG. 8 is a diagram showing the output voltage $V_{OUT}$ as the operating frequency $f_0$ varies.

FIG. 8 is a diagram showing the output voltage $V_{OUT}$ as the operating frequency varies, in which the operating frequency is changed by 1%, 2.5%, and 10%, respectively and the output voltage $V_{OUT}$ remains unaffected by these changes.

Figure 9:
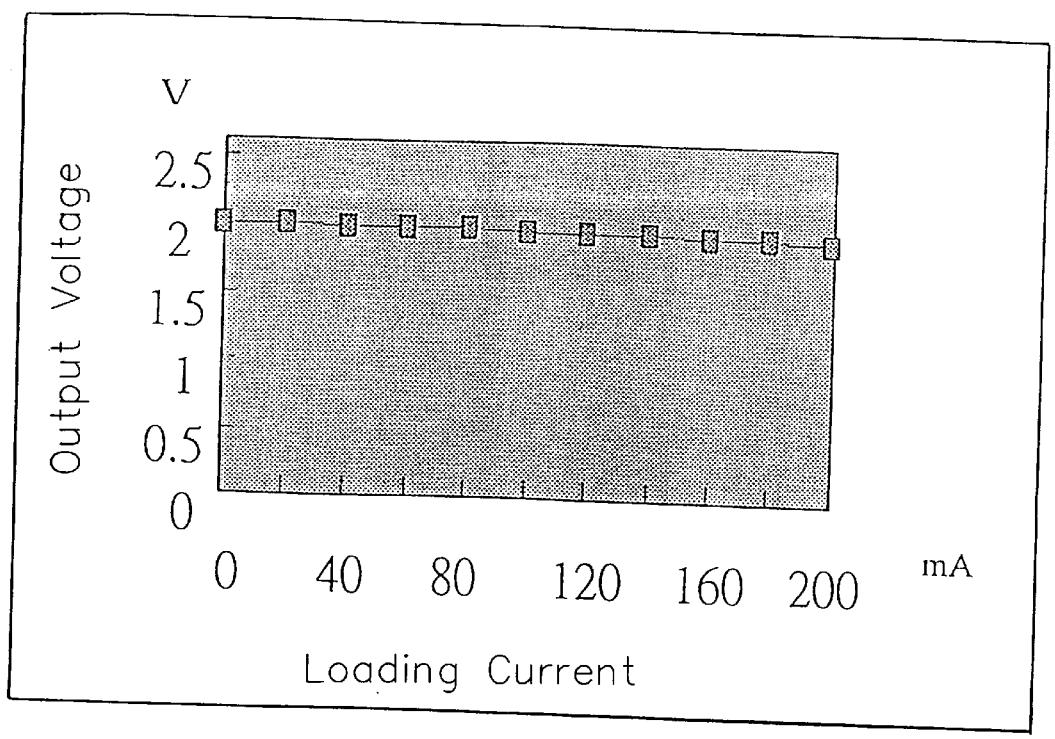
FIG. 9 is a diagram showing the relationship between the loading current $I_O$ and the output voltage $V_{OUT}$.

FIG. 9 is a diagram showing the relationship between the loading current $I_O$ and the output voltage $V_{OUT}$. Again, the output voltage $V_{OUT}$ is basically not affected by the changes in the loading current $I_O$.

TABLE 1

| Design Specifications | |
|---|---|
| Technology | TSMC 0.6 um SPTM |
| PMOS (W/L) | 20000/0.6 μm |
| NMOS (W/L) | 7500 um/0.6 μm |
| Output Voltage $V_{OUT}$ | 1V~5V (resolution: 0.125V) |
| Maximum Output Current $I_{OUT}$ | 120 mA |
| Inductance (L) | 3 μH @ 1MHz |
| | 150 nH @ 20MHZ |
| Capacitance (C) | 3 μF for 2% @ 1MHz |
| Power Efficiency | 93% @ 1MHz (See Table 2) |
| Duty Cycle Range | 20%~100% (Resolution: 2.5%) |
| Frequency Range | 1MHz~20MHz (Linear resolution: 0.625 MHz) |

TABLE 2

| | 1MHz | 10MHz | 20MHz |
|---|---|---|---|
| Power Efficiency | 93.23% | 82.50% | 78.00% |
| Power in DCO | 1.83% | 4.20% | 3.24% |
| Power in Gate Driver | 0.46% | 4.58% | 9.16% |
| Power in NMOS | 2.07% | 2.87% | 3.24% |
| Power in PMOS | 2.47% | 5.27% | 6.70% |

Therefore, the present invention is characterized by using a digital control approach to adjust the duty cycle and operating frequency of the modulated signal so as to obtain a DC output voltage. The resolution of the output voltage can be adjusted by using digital control signals with different number of bits.

It is another characteristics of the present invention that the output voltage will not vary if the loading resistance is changed, so that a robustly stable output waveform can be obtained.

It is still another characteristics of the present invention that match loading elements are included in the circuits so that every delay cell has the same loading.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital programmable direct current to direct current (DC—DC) voltage-down converter, the DC—DC voltage-down converter comprising:

a digitally controlled oscillator (DCO), wherein the DCO receives an external frequency control signal to generate a clocking signal, wherein the digitally controlled oscillator (DCO) receives a K-bits frequency control signal to generate the clocking signal;

a pulse-width modulator (PWM) coupled to the DCO to receive the clocking signal, wherein the PWM is controlled by an external duty-cycle control signal to generate a pulse-width modulation signal;

a gate driver which receives the pulse-width modulation signal from the PWM to generate a first pulse control signal and a second pulse control signal; and a switching-type voltage-down converter coupled to an external DC voltage source, wherein the switching-type voltage-down converter is controlled by the first pulse control signal and the second pulse control signal from the gate driver to generate a DC output voltage.

2. The digital programmable DC—DC voltage-down converter of claim 1, wherein the pulse-width modulator (PWM) comprises:

a plurality of delay cells which are cascaded in series;

a multiplexer having a plurality of input terminals to receive output signals from the delay cells, respectively, wherein the multiplexer is controlled by the duty-cycle control signal to generate an output signal from one of the delay cells, wherein each of the delay cells is controlled by the K-bits frequency control signal;

a match network coupled to one of the delay cells, which generates an output signal, wherein the match network has the same time delay as that caused by the multiplexer;

a flip-flop coupled to the multiplexer and the match network, wherein the flip-flop receives the output signals from the multiplexer and the match network to generate the pulse-width modulation signal.

3. The digital programmable DC—DC voltage-down converter of claim 1, wherein the gate driver comprises a plurality of inverters cascaded in series to generate the first pulse control signal and the second pulse control signal.

4. The digital programmable DC—DC voltage-down converter of claim 1, wherein the switching-type voltage-down converter comprises:

a first-type metal oxide semiconductor (MOS) transistor having a gate, source, and drain, wherein the gate of the first-type MOS transistor is used to receive the first pulse control signal and the drain is coupled to the external DC voltage source;

a second-type metal oxide semiconductor (MOS) transistor having a gate, source, and drain, wherein the gate of the second-type MOS transistor is used to receive the second pulse control signal;

a low-pass filter having two terminals coupled to the drain and source of the second-type MOS transistor;

a load resistor electrically connected in parallel to the low-pass filter, wherein the DC output voltage can be obtained by taking the voltage across the load resistor.

5. The digital programmable DC—DC voltage-down converter of claim 4, wherein the low-pass filter comprises an inductor and a capacitor cascaded in series.

6. The digital programmable DC—DC voltage-down converter of claim 4, wherein the first-type MOS transistor is a P-channel MOS transistor.

7. The digital programmable DC—DC voltage-down converter of claim 4, wherein the second-type MOS transistor is a N-channel MOS transistor.

8. A pulse-width modulator (PWM) to generate a pulse signal with an adjustable duty cycle and frequency, the PWM comprising:

a plurality of delay cells which are cascaded in series, wherein each of the delay cells is controlled by a K-bits frequency control signal;

a multiplexer having a plurality of input terminals to receive output signals from the delay cells, respective, wherein the multiplexer is controlled by a duty-cycle control signal to generate an output signal from one of the delay cells;

a flip-flop coupled to the multiplexer to generate a pulse-width modulation signal.

9. The pulse-width modulator (PWM) of claim 8, wherein the PWM further comprises a match network coupled to one of the delay cells, wherein the match network has the same time delay as that caused by the multiplexer.

* * * * *

UNITED STATES PATENT AND TRADEMARK OFFICE
CERTIFICATE OF CORRECTION

PATENT NO. : 6,181,123 B1
DATED : January 30, 2001
INVENTOR(S) : Jou et al.

It is certified that error appears in the above-identified patent and that said Letters Patent is hereby corrected as shown below:

<u>Title page,</u>
Item [73], Assignee "Farady" should read -- Faraday --

Signed and Sealed this

Twenty-seventh Day of August, 2002

Attest:

Attesting Officer

JAMES E. ROGAN
Director of the United States Patent and Trademark Office